United States Patent [19]

Adorno et al.

[11] 4,299,683
[45] Nov. 10, 1981

[54] APPARATUS AND METHOD FOR EFFICIENT TRANSFER OF POWDERED ORE

[75] Inventors: Vincent C. Adorno, Massena; Elizabeth A. Fessenden; Stephen R. Barr, both of Norwood; Zebulon T. Gibson, Jr.; John P. Carroll, both of Massena, all of N.Y.

[73] Assignee: Aluminum Company of America, Pittsburgh, Pa.

[21] Appl. No.: 169,648

[22] Filed: Jul. 17, 1980

[51] Int. Cl.³ .................. C25C 3/14; B65G 53/20; B65G 53/60
[52] U.S. Cl. .................. 204/246; 204/247; 406/89; 406/175
[58] Field of Search .............. 204/67, 245–247, 204/243 R, 243 M, 244; 406/15, 89, 155, 168, 175, 197

[56] References Cited

U.S. PATENT DOCUMENTS

| | | | |
|---|---|---|---|
| 2,746,807 | 5/1956 | Tolman et al. | 406/89 |
| 3,664,935 | 5/1972 | Johnson | 204/67 |
| 3,681,229 | 8/1972 | Lowe | 204/243 R |
| 3,780,497 | 12/1973 | Muhlrad | 204/247 UX |
| 3,827,955 | 8/1974 | Bahri et al. | 204/247 X |
| 3,870,374 | 3/1975 | Wentzel et al. | 302/28 |
| 4,016,053 | 4/1977 | Stankovich et al. | 204/67 |
| 4,205,931 | 6/1980 | Singer | 406/175 X |

Primary Examiner—Donald R. Valentine
Attorney, Agent, or Firm—Glenn E. Klepac

[57] ABSTRACT

Apparatus for transferring powdered ore from a storage tank to a bin associated with an electrolytic cell. The cell defines a chamber containing an electrolyte and includes means for transferring ore from the bin to the chamber. The apparatus comprises a fluidizing conveyor for conveying powdered ore from a storage tank to the bin, a first vent interconnecting the conveyor and bin and a second vent interconnecting the bin and chamber. In a preferred embodiment, a source of pressurized gas causes ore to flow through the conveyor, and the apparatus further comprises a pressure switch for closing the source in response to a buildup of fluid pressure in the conveyor. Another preferred feature is a fluidizing pad inside a conduit connecting the storage tank to the conveyor.

15 Claims, 6 Drawing Figures

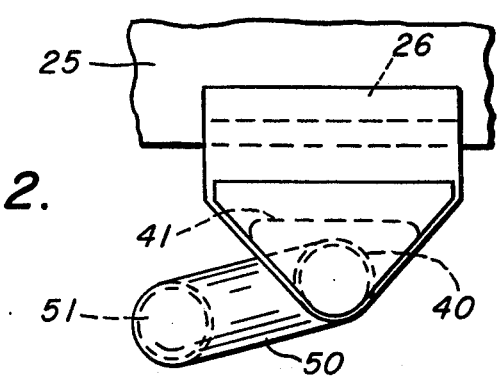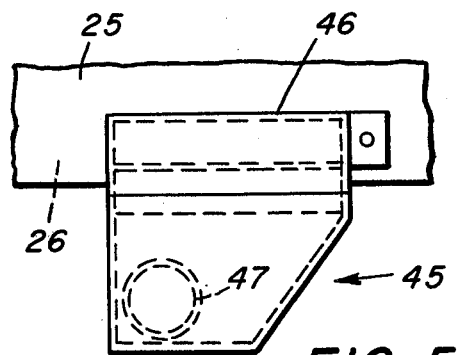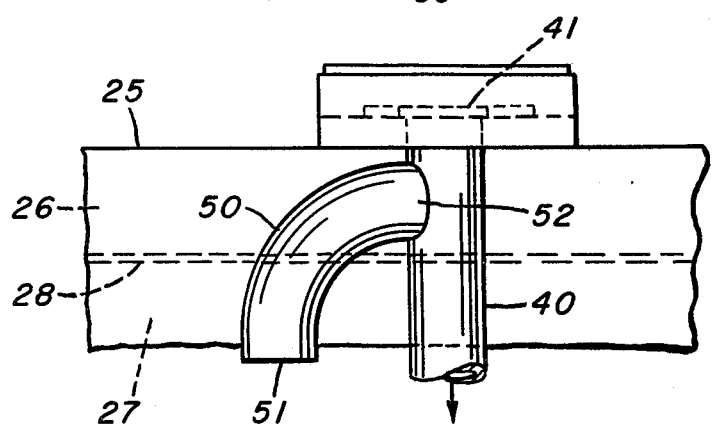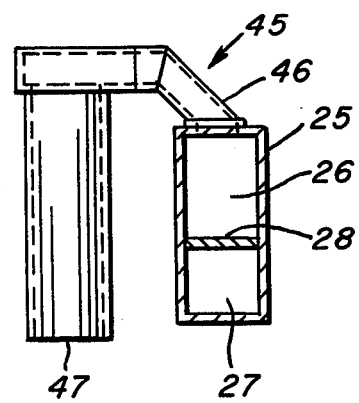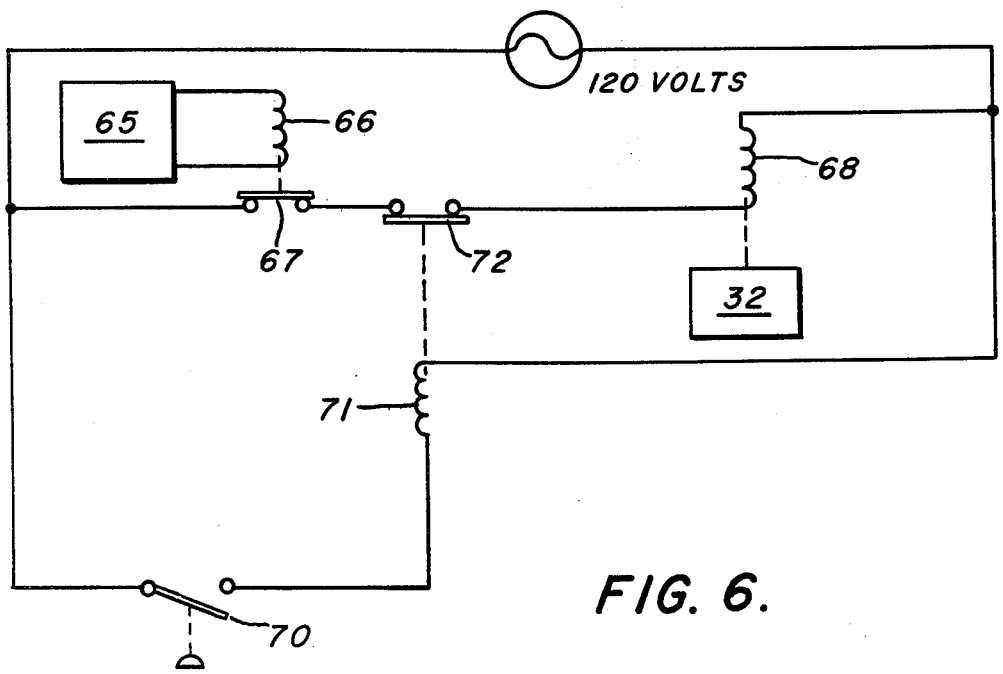

APPARATUS AND METHOD FOR EFFICIENT TRANSFER OF POWDERED ORE

BACKGROUND OF THE INVENTION

The present invention relates to apparatus and methods for transferring powdered ore from a storage tank to a bin associated with an electrolytic cell. More specifically, the invention pertains to a method for efficient transfer of powdered ore from a storage tank to a bin associated with an electrolytic cell without excessive spillage of ore into the cell and without excessive losses to the environment.

Fluidizing conveyor systems for transferring powdered ore from storage tanks to bins associated with electrolytic cells are known in the prior art. However, each of these prior art conveying systems suffers from one or more serious disadvantages making it less than completely suitable for its intended purpose.

Two representative prior art patents relating to the conveying of powdered ore to a bin associated with an electrolytic cell are U.S. Pat. No. 3,870,374 and U.S. Pat. No. 4,016,053. In both of these patents the powdered ore is carried in an upper portion of an elongated conduit having a porous, generally horizontal partition. Pressurized air carried by a lower portion of the conduit beneath the partition passes through the partition and maintains the powdered ore in the upper portion in a fluidized state. In U.S. Pat. No. 3,870,374, the fluidizing air is vented from the upper portion of the conduit through a plurality of ceiling vents. In U.S. Pat. No. 4,016,053, a fluidizing conveyor brings powdered ore to one of several feed hoppers located above a group of electrolytic cells. The feed hoppers are provided with upwardly opening vents for directing gas and entrained dust to a suitable dust-collecting facility.

The venting systems in the above-mentioned patents have been found to operate adequately when the powdered ore contains a low proportion of particulates passing through a −325 mesh sieve. However, when used in connection with ore containing a high proportion of fines (−325 mesh material), an undue burden is placed upon the venting systems. Such burden becomes especially severe when the volume of ore transported through the fluidizing conveyor per unit time is increased.

Also known in the prior art is a venting system for fluidizing conveyors associated with electrolytic cells wherein excess fluidizing air is transmitted from the ore transport conduit through a vent into the chamber of the cell. While such venting system places smaller burdens upon a dust-collecting facility associated with the cell than the systems shown in the two above-mentioned patents, it has frequently been found that an excessive volume of ore is deposited through the vent into the cell chamber. These excessive deposits have been found to result in a reduction in operating efficiency of the electrolytic cell.

It is a principal object of the present invention to provide an apparatus for efficient transfer of powdered ore from a storage tank to a bin associated with an electrolytic cell wherein the ore is conveyed through a fluidizing conveyor, and excess fluid pressure developed in the conveyor is not released directly into the cell chamber or to a dust-collecting facility associated with the cell.

It is a related object of the invention to provide a venting system for a fluidizing conveyor associated with an electrolytic cell including a first vent interconnecting the conveyor and the bin and a second vent interconnecting the bin and the cell chamber.

A further object of the invention is to provide a pressure switch associated with the fluidizing conveyor for sensing increased fluid pressure developed in the conveyor upon filling of a bin supplied by the conveyor. In response to increased fluid pressure in the conveyor, the pressure switch shuts off a source of pressurized gas supplying the conveyor.

Another object of the invention is to provide a fluidizing pad in a conduit supplying the fluidizing conveyor, thereby allowing for high speed transfer of powdered ore to the fluidizing conveyor.

Additional objects and advantages of the present invention will become apparent to persons skilled in the art from the following specification, considered in connection with the drawings.

SUMMARY OF THE INVENTION

The present invention is directed to improvements in apparatus and methods for transferring of powdered ore from place to place. While designed for usage in connection with an electrolytic cell for production of aluminum wherein powdered alumina ore is held in a bin above the cell, the invention may also find application in other industrial processes in which powdered materials are transported by means of fluidizing conveyor systems.

The invention is used in association with an electrolytic cell system comprising an electrolytic cell, a bin for storing powdered ore, means for transferring ore from the bin to the cell and a storage tank spaced from the bin for holding powdered ore prior to transfer to the bin. The electrolytic cell includes an enclosure defining a chamber containing an electrolyte and a space above the electrolyte.

The apparatus of the invention comprises a fluidizing conveyor for conveying powdered ore from the storage tank to the bin, a first vent interconnecting the conveyor and the bin and a second vent interconnecting the bin and the cell chamber. In a preferred form, the first vent has a downwardly opening upper terminus in the conveyor and a lower terminus in the bin. The second vent preferably connects the bin to the space above the cell electrolyte.

When the apparatus of the invention is used in association with an electrolytic cell for production of aluminum, powdered alumina ore is transferred through a fluidizing conveyor from a storage tank spaced from the cell to a bin generally positioned directly above the cell. Ore flows through the conveyor while being fluidized by a source of pressurized gas, usually air at a pressure of about three to five pounds per square inch gauge (20 to 35 kPa). A computerized control system or control means causes the source of pressurized gas to open and close in response to variations in cell operating characteristics. The control means includes a timer that closes off the gas source at a preselected time interval after the source is opened. This time interval is generally one minute.

In order to prevent accumulation of excessive gas pressure in the upper portion of the fluidizing conveyor, the preferred control means is provided with a pressure switch for closing the gas source in response to a buildup of fluid pressure in the conveyor. When the gas source provides air under a pressure of about three to five pounds per square inch gauge (20 to 35 kPa), the pressure switch is set to close the source when a fluid pressure of about 10 to 15 inches of water gauge (2.5 to 3.7 kPa) is detected in the upper portion of the conveyor. During a normal convey cycle of the conveyor, fluid pressure in the upper portion is about one to three inches of water gauge (0.25 to 0.75 kPa). In response to activation of the pressure switch to close the gas source, the control means causes the gas source to remain closed for a preselected time interval that is preferably about one minute.

An additional feature of the preferred apparatus of the invention is a fluidizing pad inside a conduit connecting the ore storage tank to the fluidizing conveyor. The fluidizing pad increases carrying capacity of the apparatus by minimizing the possibility of obstructions, thereby developing high ore feed rates in the conduit. The fluidizing pad also enhances ability of the conduit to handle ore containing a high proportion of fines.

BRIEF DESCRIPTION OF THE DRAWINGS

FIG. 2 is an enlarged, fragmentary view taken along the lines 2—2 of FIG. 1.

FIG. 3 is a front elevational view of the portion of the apparatus shown in FIG. 2.

FIG. 4 is an enlarged, fragmentary, cross-sectional view taken along the lines 4—4 of FIG. 1.

FIG. 5 is a top plan view of the portion of the apparatus shown in FIG. 4.

FIG. 6 is a schematic circuit diagram of the control means portion of the apparatus of the invention.

DETAILED DESCRIPTION OF A PREFERRED EMBODIMENT

Figure 1:
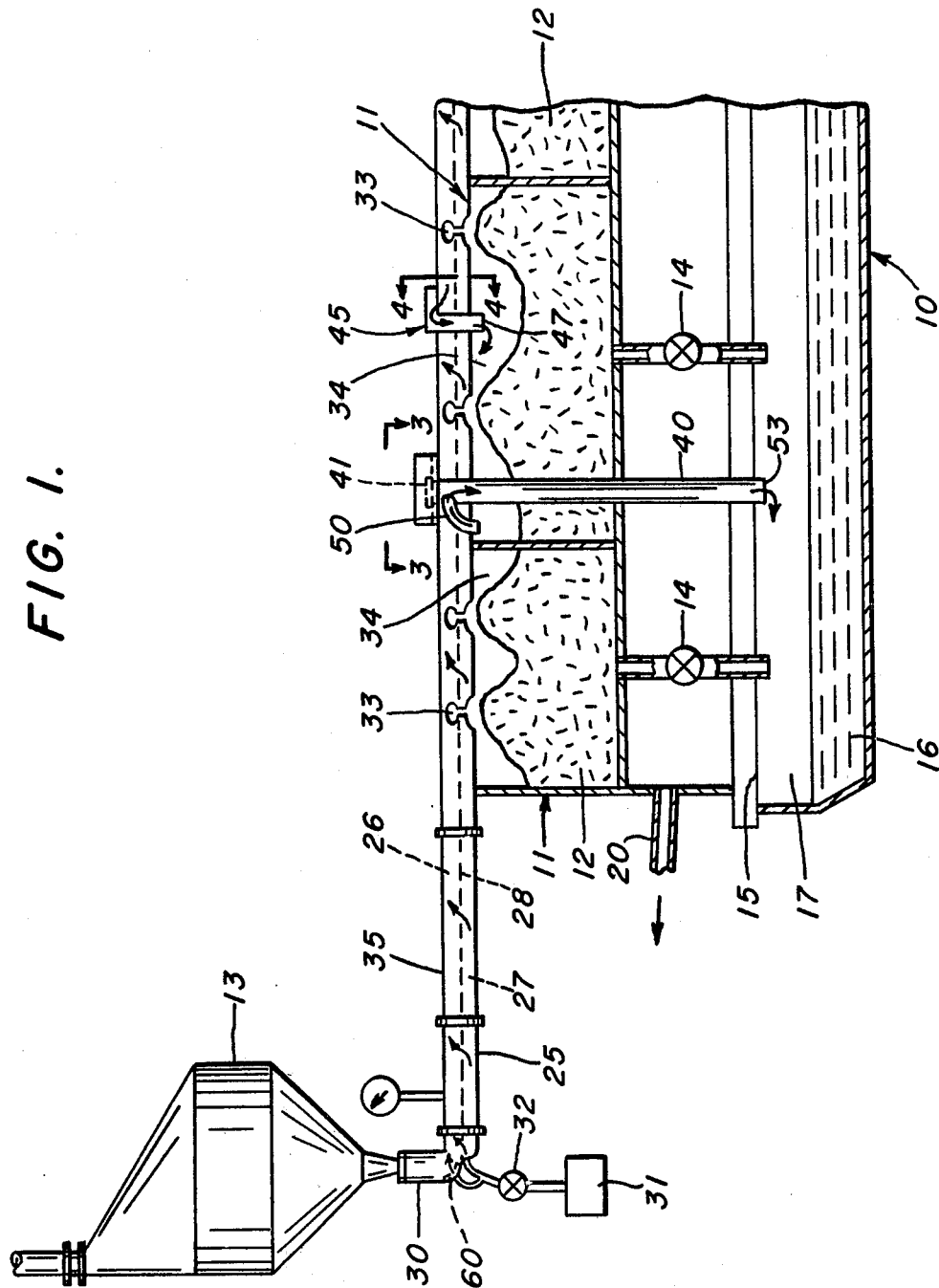
FIG. 1 is a schematic, front elevational view, partly in cross section, of a preferred powdered ore transfer apparatus constructed in accordance with the present invention.

A preferred embodiment of the apparatus of the invention is illustrated schematically in FIG. 1. The apparatus is used together with an electrolytic cell system for production of aluminum metal, comprising an electrolytic cell 10, a bin 11 above the cell 10 for storing powdered alumina ore 12, an ore storage tank or day tank 13 spaced laterally from the bin 11 and a metering device 14 for transferring ore from the bin 11 to the cell 10. The cell 10 includes an enclosure defining a chamber 15 holding an electrolyte 16 and a space 17 above the electrolyte 16. The electrolyte 16 constitutes a bath of molten cryolite containing dissolved alumina ore. Carbon electrodes (not shown) pass electric current through the electrolyte to produce molten aluminum metal.

Operation of the cell 10 involves feeding powdered alumina ore at frequent intervals from the bin 11 to the cell chamber 15. The ore is generally introduced into the electrolyte by depositing powdered alumina ore onto a layer of crust formed over the bath and by periodically breaking in a portion of the crust from above. In a preferred embodiment the ore is transferred from the bin 11 to the chamber 15 through a hollow housing surrounding a solid plunger of a crust-breaking apparatus, as shown in FIG. 4 of U.S. Pat. No. 3,681,229. It is also desirable to provide additional means for transferring ore manually from the bin 11 to chamber 15. Gaseous and particulate effluents generated during operation of the cell 10 are recovered through a side outlet 20 communicating with the space 17 above the electrolyte 16. The side outlet 20 leads to a suitable solid particulate collecting facility (not illustrated).

Powdered alumina ore is transported to the bins 11 from the day tank 13 by a fluidizing conveyor 25. The conveyor 25 is generally rectangular in transverse cross-section and is divided into an upper compartment 26 filled with alumina and a lower compartment 27 by a perforated liner or partition 28. A porous fabric hose is disposed along the length of the lower compartment 27. The partition 28 and hose permit upward passage of a fluidizing gas such as pressurized air but prevent countercurrent passage therethrough of particulate matter. Additional details of structure and operation of the fluidizing conveyor 25 are shown in U.S. Pat. No. 3,681,229, the disclosure of which is incorporated by reference to the extent not inconsistent herewith. A suitable fluidizing conveyor for transport of alumina ore is sold under the trademark AIRSLIDE.

Alumina ore is choke fed to the conveyor 25 from a day tank 13 through a generally vertical, downwardly opening conduit 30. The term "choke fed" refers to the fact that the conduit 30 and conveyor 25 remain filled with alumina, both during convey cycles of the apparatus and between such cycles. Powdered alumina ore is transported or conveyed through the conveyor 25 by a flow of pressurized gas (usually air) generated by a compressor or other gas source 31. A valve 32 maintains gas pressure during a convey cycle of the conveyor 25 at a level of about three to five pounds per square inch gauge (20 to 35 kPa) in the lower compartment 27 and at about one to three inches of water gauge (0.25 to 0.75 kPa) in the upper compartment 26. A convey cycle of the apparatus generally lasts about one minute. During each convey cycle a flow of air is generated by the gas source 31 and such flow is stopped upon completion of the cycle.

The conveyor 25 transports alumina ore lengthwise, reaching the bins 11 through several spouts 33, each of which has an upper opening along one side of the upper compartment 26 and a lower opening communicating with one of the bins 11. Piles of ore 12 are deposited in the bins 11 as shown in FIG. 1, there being a gas space 34 in each bin 11 above each ore pile 12. As each bin 11 is filled to capacity, the ore pile 12 plugs the spouts 33 and ore flow stops. If the volume of fluidizing air could be properly regulated at all times, and if conveying characteristics of the alumina ore would remain constant, then no control mechanism for the conveyor 25 would be needed other than a timing device for turning on fluidizing air at regular intervals of time and for turning off the fluidizing air after a preselected time that is greater than the time required for filling of the bins 11.

It has been found in practice that ideal conditions of constant alumina ore characteristics and properly adjusted rate of air flow cannot be depended upon in an operating smelting plant. Particle size distribution of the alumina is generally continuous but varies widely due to many factors which include source of supply, segregation in storage tanks and attrition during handling and transport. In general, excessive proportions of fine particles or of particles having such shape that they do not flow readily require higher volumes of fluidizing air in the conveyor 25. These higher volumes of fluidizing air have been found to result in flushing of alumina ore through the cell venting system after the bins 11 are filled. That is, flow of alumina no longer stops automatically when the ore bins are filled. Depending upon the type of venting system used, these excessive quantities of alumina ore may result in undue burdens upon the particulate removal system or dumping of large quantities of ore into the cell chamber 15. These conditions have resulted in fluidizing air being applied to outlet conduits 30 of the day tanks 13, which voids their self-regulating effect.

A complicating factor which makes solution of the above-described problem difficult is the difference in electrical potential between the day tanks 13 which are at ground potential and the ore bins 11. This difference can be as much as 1,000 volts DC and therefore constitutes a potentially serious safety hazard. To cope with this problem, a section 35 of the conveyor 25 is made of an insulating material such as fiberglass reinforced laminate. Obviously, there must not be any electrical control wires paralleling this insulating section 35 so that ordinary bin level sensors cannot be used to shut off the conveyor 25 when the bins 11 are filled.

Improved efficiency of ore transport has been achieved by providing the apparatus of the invention with a modified venting system, shown in FIGS. 1-5. The electrolytic cell system shown therein was previously provided with a generally vertical vent pipe 40 extending between the upper compartment 26 of the conveyor 25 and the space 17 in the cell 10. This venting system is modified in accordance with the present invention by providing a top plate 41 on the vent pipe 40, thereby closing off any direct communication between the upper compartment 26 and space 17. In addition, a first vent 45 is provided to interconnect the upper compartment 26 and the bin 11 (see FIGS. 4 and 5). The first vent 45 includes a downwardly opening upper terminus 46 communicating with the upper compartment 26, and a lower terminus 47 communicating with the space 34 in the bin 11. The first vent 45 relieves excess fluid pressure developing in the upper compartment 26 of the conveyor 25 during a convey cycle.

Pressurized air reaching the space 34 through the first vent 45 is relieved by a second vent 40, 50. The second vent 40, 50 comprises a curved pipe section 50 in combination with a lower portion of the pre-existing vent pipe 40 below the top plate 41. The pipe section 50 has a lower opening 51 in the bin 11 and an upper end 52 extending through a side opening in the vent pipe 40 (see FIGS. 2 and 3). The opening 51 in the pipe section 50 constitutes a downwardly opening upper terminus of the second vent 40, 50. The lower terminus of the second vent 40, 50 is a lower end portion 53 of the pipe 40 which extends downwardly into the space 17 in the cell chamber 15. The second vent 40, 50 relieves fluid pressure from the bin 11 to the space 17 in the cell chamber 15.

It has been found that the first vent 45 and second vent 40, 50 will relieve excess fluid pressure from the upper compartment 26 during a convey cycle, without depositing excessive amounts of ore in the cell chamber 15. Instead, the major proportion of ore accompanying such excess fluid pressure is dropped into the bin 11. In a smelting plant having several cells 10 and associated bins 11 aligned in a linear array, it has been found sufficient to provide only a center bin of the array with the first and second vents of the invention. The center bin provides enough air space 34 that the vent pipe 40 does not spill excessive quantities of alumina into the chamber 15. The venting system provides sufficient time for all bins in a line to be filled before the convey cycle ends.

An additional feature of the apparatus of the invention is a fluidizing pad 60 inside the conduit 30 between the day tank 13 and conveyor 25. The valve 32 regulates supply of pressurized air reaching the pad 60 from the gas source 31. The fluidizing pad 60 is only activated during a normal computer scheduled convey cycle of the apparatus. The fluidizing pad provides a diffuse flow of fluidizing air to the conduit 30 and to an end portion of the upper compartment 26 of the conveyor 25 through an opening having dimensions of approximately 4 inches × 7 inches. Increased feed rate capacity of the conveyor 25 is the primary benefit in providing the pad 60. This increased capacity allows increased time between convey cycles, thus optimizing the quantity of alumina conveyed for a given amount of air. Measured convey rates of an apparatus provided with a pad 60 have exceeded 100 pounds of alumina per minute compared with 20 pounds of alumina for normal conveyors. The fluidizing pad 60 also enables the conveyor 25 to handle alumina ore having a greater content of −325 mesh particles than a conveyor not so equipped.

Referring now more particularly to FIGS. 1 and 6, the apparatus of the invention includes a control means for opening and closing valve 32 in response to conditions in the cell 10 and bin 11. The control means shown in FIG. 6 includes a computer 65 having a coil 66 connected to a switch 67 in series with a convey solenoid 68. Closing the computer-activated switch 67 activates the convey solenoid 68, thereby opening the valve 32. The computer 65 includes a timer for opening the switch 67 at a preselected time interval (preferably one minute) after the circuit is closed, thereby closing off the valve 32.

The apparatus of the invention is also provided with a pressure switch 70 communicating with the upper compartment 26. A preferred pressure switch 70 is sold under the trademark MERCOID, Model PG-153. The pressure switch 70 is mounted on top of the conveyor 25, approximately 28 inches from the base of the day tank 13. When the conveyor 25 conveys alumina, fluid pressure in the upper compartment 26 is typically about two inches water gauge (0.5 kPa). When all bins 11 are full and the upper compartment 26 begins to fill with alumina, the fluid pressure increases to about 10 to 15 inches water gauge (2.5 to 3.7 kPa). At ten inches water, the switch is set to activate a timing coil 71 which opens a timing switch 72 in series with the switch 67 and convey solenoid 68. The timing coil 71 prevents activation of the convey solenoid 68 for a preselected time interval after the pressure switch 70 is activated. In the embodiment shown in FIG. 6, this time interval is one minute. Therefore, the conveyor 25 does not convey again until a new convey cycle is scheduled by the computer 65. Each individual line of cells 10 has its own convey frequency based upon the rate of feed of alumina ore to that line.

The apparatus of the invention provides several benefits compared with prior art conveyor systems. A major benefit is the ability to maintain a constant supply of alumina ore to the bins 11. The apparatus drastically reduces the number of man-hours required for manually conveying alumina to the bins 11 and also optimizes utilization of convey air by greatly increasing the time between computer scheduled convey cycles.

Some of these benefits were exhibited on two electrolytic cell systems that were modified in accordance with the invention. The first cell system (Pot 186) was provided with a first vent 45, second vent 40, 50, pressure switch 70 and fluidizing pad 60. The second cell system (Pot 187) was provided with a fluidizing pad 60 and pressure switch 70, but not a first vent 45 or second vent 40, 50.

Some economic benefits of providing an electrolytic cell system with the apparatus of the invention are shown in Table I. In the eleven-day period, March 21–March 31, potman interactions were totally eliminated on the first system and were reduced to only 0.8 interactions per pot per day on the second system. In contrast, all cell systems operated in accordance with the prior art required at least 2.2 potman interactions per pot per day when operated in the same smelting plant with similar supplies of alumina ore.

A further benefit of the invention shown in Table I is that the computer scheduled interval between convey cycles was increased to at least twenty minutes in cell systems modified in accordance with the present invention, whereas a system operated in accordance with the prior art had a convey cycle interval of only four minutes. Increasing the time interval between convey cycles allows a greater quantity of alumina ore to be conveyed for a given quantity of pressurized air, thereby resulting in energy savings.

TABLE I

| | Potman Interactions/Pot/Day | | |
|---|---|---|---|
| Time Period | Pot 186 | Pot 187 | Rest of Section-28 Pots |
| Feb. 01–March 20 | 2.9 | 4.4 | 2.6 |
| March 21–March 31 | 0 | 0.8 | 2.2 |
| | Computer Scheduled Convey Cycle Interval | | |
| Date | Pot 186 | Pot 187 | (Avg. Rest of Section - 28 Pots) |
| March 31 | 20 minutes | 30 minutes | 4 minutes |

The foregoing description of our invention has been made with reference to a preferred embodiment thereof, and numerous changes and modifications may be made therein without departing from the spirit and scope of the invention as defined in the following claims.

What is claimed is:

1. In combination with an electrolytic cell system comprising a chamber containing an electrolyte, a bin for storing powdered ore, means for transferring ore from the bin to the chamber and a storage tank spaced from the bin for holding ore prior to transfer to the bin; apparatus for efficient transfer of powdered ore from the storage tank to the bin, said apparatus comprising
 a fluidizing conveyor for conveying powdered ore from the storage tank to the bin;
 a first vent for relieving fluid pressure from the conveyor, said first vent interconnecting the conveyor and the bin; and
 a second vent for relieving fluid pressure from the bin, said second vent interconnecting the bin and the chamber.

2. The apparatus of claim 1 wherein said first vent has a downwardly opening upper terminus in the conveyor and a lower terminus in the bin.

3. The apparatus of claim 1 wherein said chamber further contains a space above the electrolyte and wherein said second vent interconnects the bin and the space above the electrolyte.

4. The apparatus of claim 3 wherein said second vent has a downwardly opening upper terminus in the bin.

5. The apparatus of claim 1 wherein said fluidizing conveyor includes a source of pressurized gas and further comprising control means for opening and closing said source, said control means including a timer for closing said source at a preselected time interval after said source is opened.

6. The apparatus of claim 5 wherein said control means further comprises
 a pressure switch for closing said source in response to a predetermined fluid pressure in said conveyor.

7. The apparatus of claim 6 wherein said control means includes a timing relay switch for closing said source a preselected time interval after the pressure switch is activated.

8. The apparatus of claim 6 wherein said predetermined fluid pressure is about 10 to 15 inches of water.

9. The apparatus of claim 1 wherein said fluidizing conveyor includes a source of pressurized gas, said apparatus further comprising a pressure switch for closing said source in response to a predetermined fluid pressure in said conveyor.

10. The apparatus of claim 1 wherein the storage tank is spaced upwardly of the conveyor and a conduit connects the storage tank to the conveyor, said apparatus further comprising
 a fluidizing pad inside said conduit for assisting transfer of powdered ore from said storage tank to said conveyor without obstructing said conduit.

11. The apparatus of claim 1 wherein said ore is powdered alumina having a continuous distribution of particle sizes.

12. In combination with an electrolytic cell system comprising a chamber containing an electrolyte, a bin for storing ore, means for transferring ore from the bin to the chamber and a storage tank spaced from the bin for holding ore prior to transfer to the bin;
 apparatus for efficient transfer of powdered ore from the storage tank to the bin, said apparatus comprising
 a fluidizing conveyor for conveying ore from the storage tank to the bin, said conveyor including a source of pressurized gas;
 a conduit connecting the storage tank to the conveyor;
 a fluidizing pad inside said conduit for assisting transfer of ore from the storage tank to the conveyor without obstructing the conduit; and
 a pressure switch connected to the conveyor for shutting off the source of pressurized gas in response to a predetermined fluid pressure therein.

13. A method for transferring powdered ore to a bin in an electrolytic cell system from a storage tank spaced from the bin, said cell system including a chamber containing an electrolyte, a bin for storing ore proximal to the chamber, means for transferring ore from the bin to the chamber and a storage tank spaced from the bin for holding ore prior to transfer to the bin, said method comprising the steps of
 conveying ore in a fluidizing conveyor from the storage tank to the bin;
 relieving excess fluid pressure in the conveyor by means of a first vent interconnecting the conveyor and the bin; and
 relieving excess fluid pressure from the bin by means of a second vent interconnecting the bin and the chamber.

14. The method of claim 13 wherein a conduit connects the storage tank to the conveyor, and further comprising the step of
fluidizing ore in the conduit by means of a fluidizing pad.

15. The method of claim 13 further comprising the steps of
sensing fluid pressure in the conveyor; and
shutting off the conveyor in response to a predetermined fluid pressure therein.

* * * * *